US006282734B1

(12) United States Patent
Holberg

(10) Patent No.: US 6,282,734 B1
(45) Date of Patent: Sep. 4, 2001

(54) PORTABLE PATIENT MOVING DEVICE

(76) Inventor: Fred Holberg, 3457 Hog Island Rd., Surry, VA (US) 23883

( * ) Notice: Subject to any disclaimer, the term of this patent is extended or adjusted under 35 U.S.C. 154(b) by 0 days.

(21) Appl. No.: 09/379,598

(22) Filed: Aug. 24, 1999

(51) Int. Cl.[7] ....................................................... A61C 7/10
(52) U.S. Cl. ........................................... 5/81.1 HS; 5/84.1
(58) Field of Search ................................ 5/81.1 R, 84.1, 5/81.1 HS, 81.1 T; 414/921

(56) References Cited

U.S. PATENT DOCUMENTS

| | | | | |
|---|---|---|---|---|
| 659,755 | * | 10/1900 | Moulton | 5/81.1 HS |
| 942,606 | | 12/1909 | Wilson . | |
| 1,085,879 | * | 2/1914 | Skeffington | 5/81.1 HS |
| 2,827,642 | * | 3/1958 | Huff | 5/81.1 R X |
| 3,962,736 | | 6/1976 | Fedele | 5/81 R |
| 4,679,259 | | 7/1987 | DiMatteo et al. | 5/81 R |
| 4,799,273 | | 1/1989 | Elze | 5/81 R |
| 4,941,220 | | 7/1990 | DiMatteo et al. | 5/81 R |
| 5,280,657 | | 1/1994 | Stagg | 5/81.1 |
| 5,469,588 | | 11/1995 | DiMatteo et al. | 5/81.1 |
| 5,608,929 | | 3/1997 | Crane | 5/81.1 R |
| 5,697,109 | | 12/1997 | Hodgetts | 5/81.1 R |
| 5,996,144 | * | 12/1999 | Hodgetts | 5/81.1 HS |

* cited by examiner

*Primary Examiner*—Lynne H. Browne
*Assistant Examiner*—Fredrick Conley
(74) *Attorney, Agent, or Firm*—Connolly Bove Lodge & Hutz

(57) ABSTRACT

A portable patient moving device which is detachably connected to a bed frame. A first and a second detachable bearing support is connected to the bed frame, and supports near the head end thereof a shaft for rotation. A plurality of straps have one end connected to the shaft, and extend along the length of the bed to a patient support. By rotating the shaft, it is possible to move a patient which has been placed on the patient support longitudinally the bed frame. The entire device may be conveniently detached from the bed frame and moved to another bed frame as necessary.

11 Claims, 3 Drawing Sheets

PORTABLE PATIENT MOVING DEVICE

BACKGROUND OF THE INVENTION

The present invention relates to a device for moving a patient longitudinally along the length of a bed. Specifically, the portable patient moving device may be readily attached and detached to a standard bed frame to permit its use in a variety of locations.

Immobile patients confined to bed require considerable handling when being removed from and returned to bed. The process requires considerable institutional manpower by nurses and orderlies, to safely handle the patient when being removed or returned to bed. Patients often are under considerable pain or stress, and the process must be carried out so as not to make the patient any more uncomfortable.

A device which is useful for moving a patient along the length of a bed is described more particularly in U.S. Pat. No. 2,827,642. The device is permanently affixed to the head end of a conventional bed. A crank handle is provided which is connected through a series of webbing to first and second fabric supporting sections. When a patient is placed on the fabric supporting sections, he is moved into place along a bed length by rotation of a crank handle.

The permanent installation of such devices on a bed is unnecessary where patients are sufficiently ambulatory to be removed from and returned to a bed. Requiring each bed to have such a device unnecessarily duplicates the expense of employing such mechanical devices. The present invention is directed to a mechanical device which will assist in moving a patient into and out of bed, and which can be moved from bed to bed, avoiding unnecessary duplication of the device on every bed.

SUMMARY OF THE INVENTION

It is a primary object of this invention to provide a portable patient moving device which may be conveniently attached to a bed.

It is a more specific object of this invention to provide a mechanically operated system for moving a patient from one end of a bed to another.

These and other objects of the invention are provided by a patient moving device which may be attached and detached to a bed frame as needed. First and second detachable bearing supports are connected to opposite sides of the bed frame, preferably near the head end thereof. The detachable bearing supports support a shaft which can be rotated within the bearing supports. Straps, which extend along the length of the bed, are connected to the shaft. A patient support connected at an opposite end of the straps is slid longitudinally along the bed in response to rotation of the shaft. The device is readily detached when its use was no longer needed, and moved to other beds within a facility to assist in the removal of patients into and out of bed.

DESCRIPTION OF THE PREFERRED EMBODIMENTS

Figure 1:
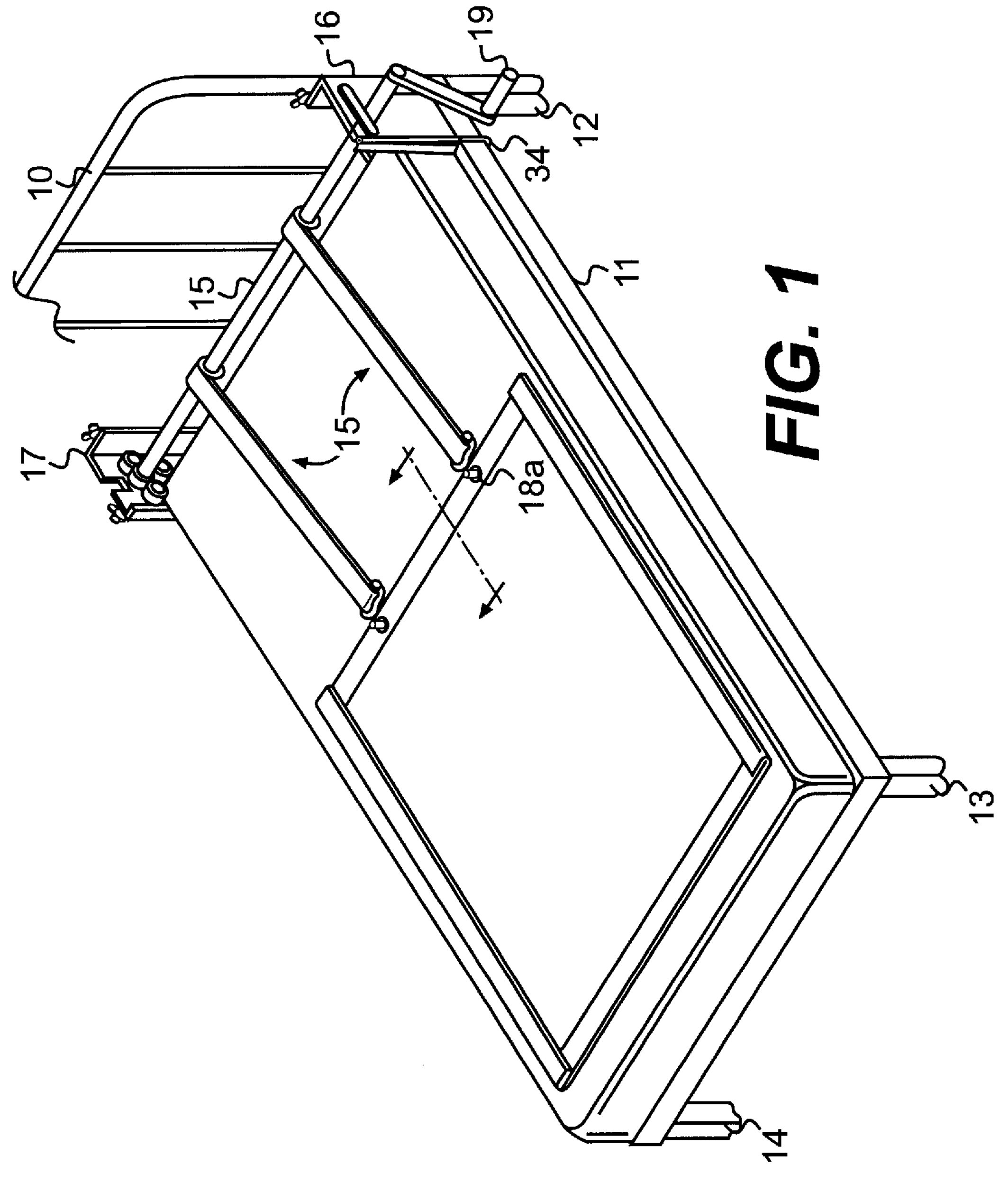
FIG. 1 is a plan view of a device in accordance with a preferred embodiment of the invention.

Referring now to FIG. 1, there is shown a plan view of the portable patient moving device in accordance with a preferred embodiment of the invention. The device is connected to a standard bed frame 11, having a head end section 10, and supported by a plurality of legs (12, 13 and 14 of which are shown), which supports a mattress 9.

Located on top of the mattress is a patient support 18 which is connected at one end to a plurality of straps 20, which may be two or more, but as shown in FIG. 1, is preferably four. The straps 20 are connected at an opposite end for rotation about a shaft 15. Shaft 15 is, in turn, held in two bearing supports 16 and 17 which are detachably connected to the bed frame 11. Thus, the entire device comprising the patient support 18, straps 20, shaft 15 and the bearing supports 16 and 17 may be readily removed from the bed frame 11, and located at another bed frame when a different patient is to be moved.

As is evident from FIG. 1, when a patient is positioned on patient support 18, he may be moved longitudinally along the mattress surface 9 by rotating handle 19 connected to shaft 15. Rotation of shaft 15 in a clockwise direction will result in the straps 20 being wrapped about shaft 15, moving the patient towards the head end of the bed 18 with considerably less manpower, as well as less discomfort than might otherwise result from attempting to move the patient.

Figure 2:
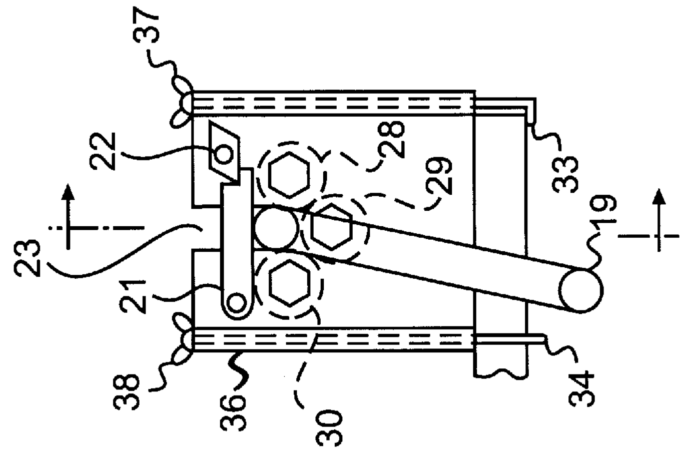
FIG. 2 is a side view of the device in accordance with the present invention.
Figure 4:
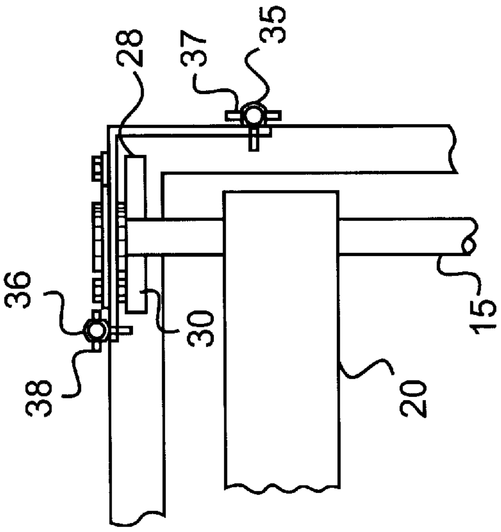
FIG. 4 is a top view of the bearing support 17.

The bearing supports 16 and 17 are essentially the same, a side view of bearing support 16 being shown in FIG. 2, and a top view of bearing support 17 being shown in FIG. 4. Referring now to FIGS. 2 and 4, there is shown a generally vertical support plate 24 having two angle sections on two vertical sides. A tube 35, 36 is welded to each of the angle sections, through which J hooks 33 and 34 extend. J hooks 33 and 34 engage the bottom of the bed frame 11, along the head end, and lateral sides thereof. The J hooks 33 and 34 have threads at the opposite end thereof, which engage wing nuts 37 and 38. Thus, the wing nuts may be used to secure the entire bearing support 16, 17 to the bed frame 11, and may permit its expeditious removal along with the remaining components of the portable patient moving device.

The support plate 24 includes along the top thereof a slot 23 which receives shaft 15. Shaft 15 in turn is supported for rotation tangentially to rollers 28, 29 and 30. Rollers 28, 29 and 30 are attached to the plate 24 to freely rotate, providing a rotating bearing support for shaft 15.

Figure 3:
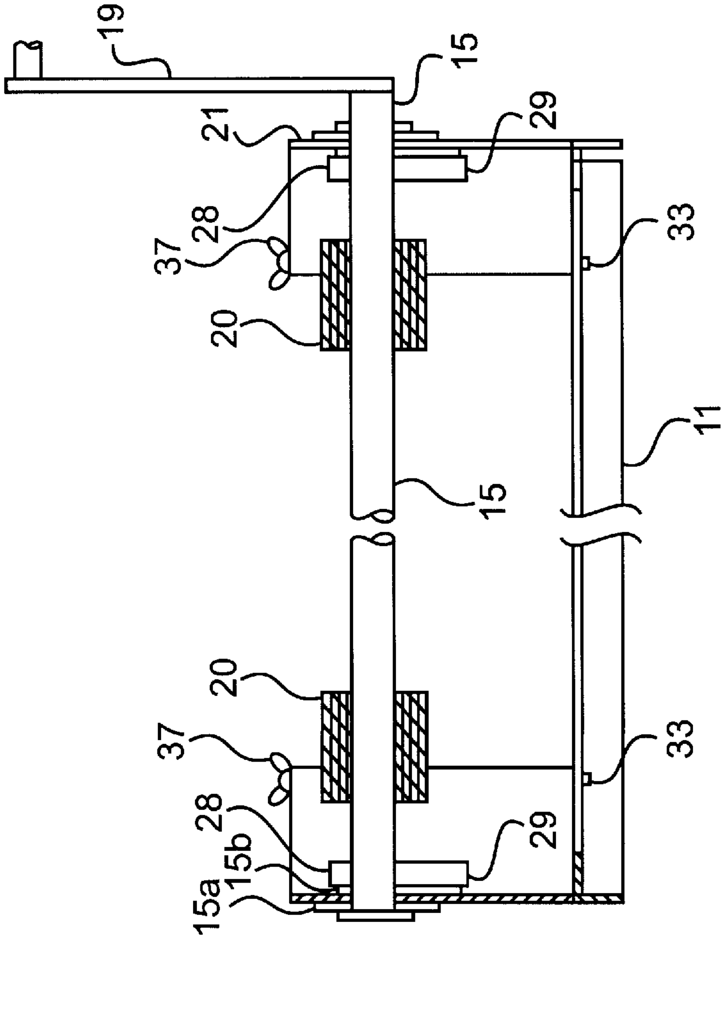
FIG. 3 is a section view of FIG. 2 illustrating the support of the rotating shaft in each of the bearing supports.

FIG. 3 illustrates a section view of the entire apparatus looking towards the head end 10 of the bed frame. Shaft 15 has at one end a crank 19 for permitting rotation of the shaft, and at the other end, a stop member comprising two washers 15*a*, 15*b* welded to the shaft 15. The two washers 15*a*, 15*b* captivate the support plate 24. Shaft 15 is held in place by a retaining member 21, which engages a catch 22 fixed on support plate 24. When the bearing supports and remaining components of the patient moving device are to be removed from the bed, the retaining member 21 is released from the catch 22, permitting the shaft 15 and straps 20 to be removed from the bed.

Figure 5:
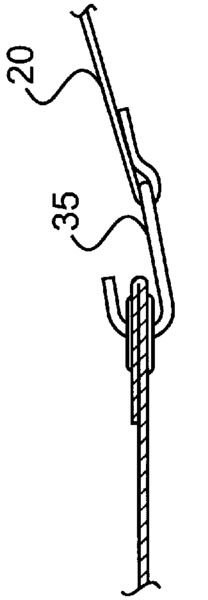
FIG. 5 illustrates the connection of the strap to the patient support.

FIG. 4 illustrates the section view showing the straps as they are wound about the shaft 15. The straps 20 are at the opposite end thereof, terminated in a hook 25, as is shown in FIG. 5. Hook 25 engages reinforced openings 18*a* on the end of the patient support 18.

The foregoing device can be readily moved from bed to bed, once the patient support is detached from straps 20, and shaft 15 is removed from the bearing supports. The J hooks 33 and 34 provide a convenient clamping means which can be readily detached from the frame. The J hooks are intended only as an example of one type of detachable clamping means, to permit the device to be moved from bed to bed.

Figure 7:
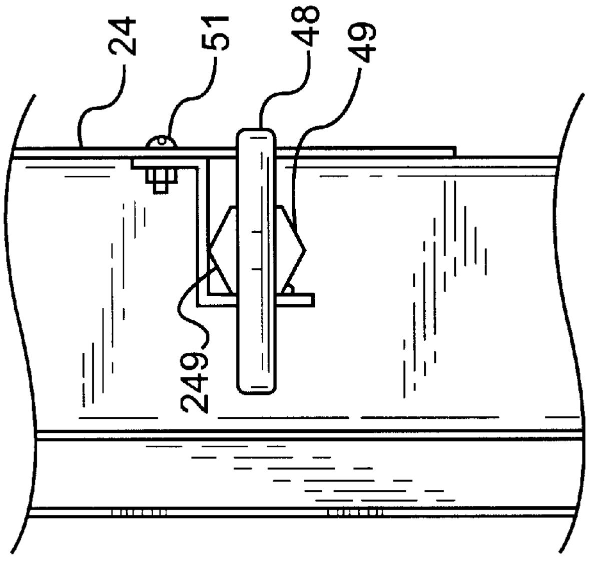
FIG. 7 illustrates a top view of the embodiment of FIG. 6.
Figure 6:
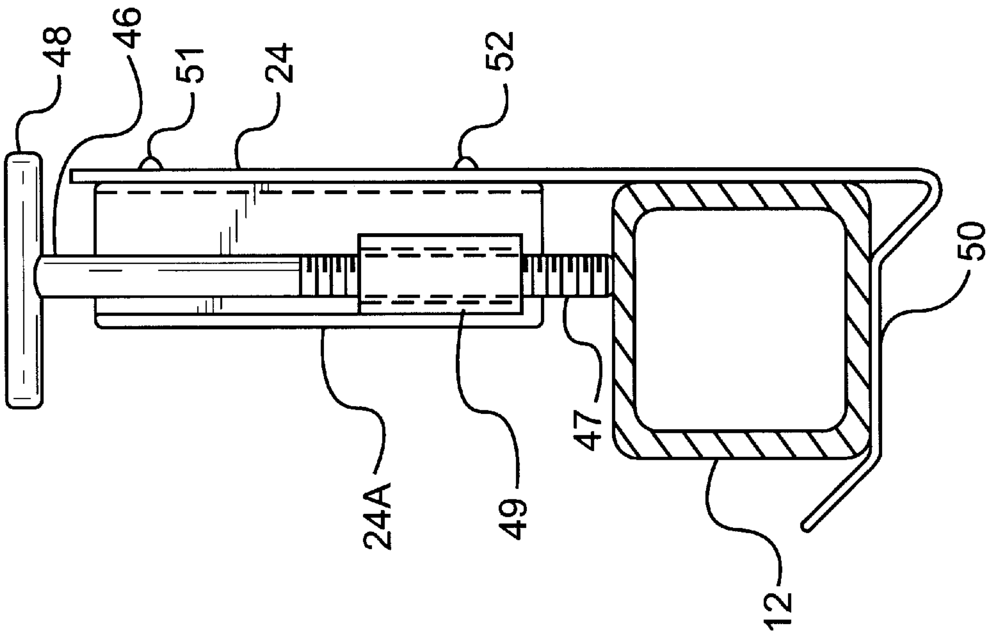
FIG. 6 illustrates a side view of an alternative embodiment of the invention.

Referring now to FIGS. 6 and 7, an alternative means is shown for attaching the patient moving device to the rails 12 of a bed frame having a rectangular cross section. Extending bracket 24*a* is fastened to vertical support plate 24 by fasteners 51, 52, and holds a bolt 46 having threads at one end 47 and a T-handle 48 at the other end. The bolt extends through the bracket and through a threaded bushing 49 attached to the bracket 24*a*. The vertical support plate 24 includes a horizontally extending end 50 which passes on the underside of the rail 12. The threaded end 47 and horizontally extending end 50 clamp the vertical support bracket 24 to the rail 12 of the bed frame.

Those skilled in the art will recognize other clamping devices which are equivalent thereto, and which may be used for holding the bearing supports 16 and 17 to the frame 11.

Thus, there has been described with respect to one embodiment of the invention a portable patient moving device. Those skilled in the art will recognize in other embodiments of the invention defined more particularly by the claims which follow.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A portable patient moving device comprising:

a first detachable bearing support having an attachment means for detachably securing the bearing support to one side of a bed frame;

a second detachable bearing support having an attachment means for detachably securing the bearing support to another side of said bed frame;

a shaft having on one end thereof a handle, supported for rotation by said bearing supports;

a plurality of straps connected at one end to said shaft for extending along the length of a bed supported on said frame; and a patient support connected at one end to a free end of each of said straps, said patient support for moving along the bed in response to rotation of said shaft by said handle whereby a patient on said patient support is moved along a length of said bed.

2. The portable patient moving device according to claim 1 wherein said straps are provided at said free ends with a detachable connection member for engaging one end of said patient support.

3. The portable patient moving device according to claim 2 wherein said detachable connection member is a hook which engages a hole in said patient support.

4. The portable patient moving device according to claim 1 wherein said bearing supports comprise:

a vertically upstanding plate having a slot for receiving said shaft, and having a plurality of rollers supported tangentially to said slot to rotatably support said shaft.

5. The portable patient moving device according to claim 4 wherein said attachment means are J hooks for engaging said bed frame, having a threaded end secured to said plate by a threaded member.

6. The portable patient moving device according to claim 4 further comprising a retaining member pivotally connected to said plate for retaining said shaft in said slot.

7. A portable patient moving device comprising:

a shaft having means on one end thereof for rotating said shaft;

a plurality of straps connected at one end to said shaft, for extending along a length of a bed;

a pair of bearing supports detachably supported to a frame of said bed, each of said supports comprising:

a support plate having a slot for receiving said shaft;

roller members supported about said slot for supporting said shaft for rotation; and clamping members connected to said plate for detachably securing said bearing support to said bed frame; and a patient support connected to a free end of said straps, said patient support for moving along a length of said bed in response to rotation of said shaft.

8. The portable patient moving device according to claim 7 wherein said bearing supports further comprise a retaining member for maintaining said shaft in said slot.

9. The portable patient moving device according to claim 7 wherein said free end of said straps are detachably connected to said patient support.

10. The portable patient moving device according to claim 7 wherein said free ends of said straps are detachably connected to said patient support by hooks extending through holes in said patient support.

11. The portable patient moving device according to claim 7, wherein said clamping members comprise a threaded bolt extending through a threaded bushing on a bracket connected to said support plate, and wherein the support plate extends below said bed frame and horizontal thereto, whereby said plate and end bolt clamp said support plate to said bed frame.

* * * * *